(12) United States Patent
Yuan et al.

(10) Patent No.: US 8,479,051 B2
(45) Date of Patent: Jul. 2, 2013

(54) SYSTEM AND METHOD FOR CUSTOMIZED ERROR REPORTING

(75) Inventors: Hsu-chieh Yuan, Sammamish, WA (US); Kinshumann Kinshumann, Redmond, WA (US); Cristian G. Petruta, Redmond, WA (US); Varun Bahl, Redmond, WA (US); Richard M. Byers, Bellevue, WA (US); Jonathan W. Keljo, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 358 days.

(21) Appl. No.: 12/358,708

(22) Filed: Jan. 23, 2009

(65) Prior Publication Data

US 2010/0192132 A1    Jul. 29, 2010

(51) Int. Cl.
  *G06F 11/00*  (2006.01)
(52) U.S. Cl.
  USPC ...................................................... 714/38.1
(58) Field of Classification Search
  USPC .............................. 714/35, 38.1, 55; 717/124
  See application file for complete search history.

(56) References Cited

U.S. PATENT DOCUMENTS

| 5,787,245 | A | 7/1998 | You et al. |
| 6,269,459 | B1 | 7/2001 | Wahlig |
| 6,324,683 | B1 | 11/2001 | Fuh et al. |
| 6,594,774 | B1 * | 7/2003 | Chapman et al. ................. 714/2 |
| 6,973,643 | B2 * | 12/2005 | Goldsmith et al. ........... 717/124 |
| 7,240,303 | B1 | 7/2007 | Schubert et al. |
| 2004/0123187 | A1 * | 6/2004 | Colyer ............................. 714/38 |
| 2004/0268319 | A1 * | 12/2004 | Tousignant ................... 717/131 |
| 2006/0161582 | A1 | 7/2006 | Aghajanyan |
| 2006/0184842 | A1 * | 8/2006 | Boucher ......................... 714/55 |
| 2006/0277442 | A1 * | 12/2006 | Lantz et al. ..................... 714/38 |
| 2008/0172583 | A1 | 7/2008 | Mahajan et al. |

FOREIGN PATENT DOCUMENTS

EP    0867004 B1    3/2007

OTHER PUBLICATIONS

"How to: Configure Microsoft Error Reporting," http://msdn.microsoft.com/en-us/library/bb219076.aspx, Microsoft Corporation Dec. 2006, downloaded Nov. 25, 2008.

(Continued)

*Primary Examiner* — Scott Baderman
*Assistant Examiner* — Joseph Kudirka

(57) ABSTRACT

An error reporting system within the operating system of a computer that provides error reporting and/or debugging for managed applications. The error reporting service supports a registration programming interface through which applications that use non-native or non-standard error reporting functions can register runtime exception modules. A similar interface may be provided for applications to register debuggers. In response to a failure, such as a crash or an application hang, the error reporting service can poll the registered components to ascertain whether any is adapted for use in conjunction with such a failure. If so, the appropriate registered components can be used to collect failure data and/or debug the failed application. In this way, the error reporting service, and an existing framework that supports aggregation of application error reports, can be customized, including to allow error reporting and debugging of non-native applications.

13 Claims, 5 Drawing Sheets

OTHER PUBLICATIONS

Shapiro et al., "The Modular Debugger," http://learningsolaris.com/docs/chpt_mdb_os.pdf, Jan. 30, 2006, draft from Solaris Internals $2^{nd}$ Ed., Chapter 3, pp. 123-218, downloaded Nov. 25, 2008.

"Windows Feedback Services: Developing with Windows Feedback Services," http://msdn.microsoft.com/en-us/library/bb756974.aspx, Microsoft Corporation 2008, downloaded Nov. 25, 2008.

Carruth, M., "crashrpt: A crash report and customer feedback system for Windows applications," http://code.google.com/p/crashrpt/, Google 2008, downloaded Nov. 25, 2008.

"Any Google Chrome Users," http://www.dvdverdict.com/juryroom/viewtopic.php?f=52&t=2695, phpBB Group, phpBB © 2000, 2002, 2005, 2007, downloaded Nov. 25, 2008.

* cited by examiner

SYSTEM AND METHOD FOR CUSTOMIZED ERROR REPORTING

BACKGROUND

To improve the quality of software applications, error reporting services have been provided by operating system vendors. These services, such as the error reporting service provided as part of the WINDOWS® operating system, collect data about applications running on the WINDOWS® operating system that experience failures. This information may be aggregated at a central point so that patterns that reveal the source of failures can be identified and used to improve the applications.

Such error reporting may be triggered by an unhandled exception. An exception indicates a problem with an application. Certain problems, such as invalid input, are anticipated by application developers and handlers for certain exceptions may be provided within an application. But, if no mechanism for handling an error is provided, the application may fail to operate or "crash."

Error reporting may also be triggered when an application fails to respond for a period of time, such as an "application hang." An application hang may be caused by a number of conditions, such as encountering an infinite loop in the application code, a deadlock condition, or resource starvation.

The failure may therefore trigger the operating system to perform error reporting. For example, in the case of an application generating an unhandled exception, a component of the operating system may prompt a user for permission to report crash data. If so, that component may gather data about the application that generated the exception, including the module of the application in which the crash occurred and the offset within the module corresponding to the last instruction executed before the crash occurred. In some computer environments, the error data from a variety of applications and/or from a number of computers may be transmitted to another entity for analysis, for example, by transmitting the data over the Internet to a computer server administered by a third party, which could be the provider of the application or the operating system.

Upon the detection of an application failure, it may also be useful to allow sophisticated users to debug the application exhibiting the failure. For example, after detecting an application crash, a component in the operating system may present the user with the option to launch an application debugger program on the crashed application. This has the benefit of allowing the user to analyze the cause of the error in real time.

SUMMARY

The inventors have recognized and appreciated that error reporting services within operating systems, while useful for collecting failure data (such as may relate to an application hang or a crash) associated with many native mode applications configured for execution on the operating system, may be inadequate for collecting failure data associated with managed applications or even some native mode applications. Managed applications, rather than executing directly on the operating system, execute in a managed runtime. As a result, the specific steps used by an error reporting service within an operating system to collect crash data on an application native to the operating system may not work with a managed application or may not yield meaningful results. Moreover, the data collected for native mode applications may not provide a full picture of operation of the managed application at the time of a crash. As another example, some native mode applications may benefit from additional or alternative data being reported than what is provided by the default error reporting scheme of the operating system. Similarly, a debugger provided by an operating system may not work with a managed application or may not include enough features for certain native-mode applications. Thus, an error reporting service within an operating system may not be able to offer users a meaningful opportunity to debug certain applications, including managed applications, in the event of a failure.

In some embodiments, an error reporting service within a computer allows applications to register runtime exception modules and/or debuggers. If an application fails, the error reporting service can invoke a runtime exception module and/or debugger specific to the crashed application. The runtime exception module may collect failure data relevant to its associated application and make that data available to the error reporting service. This runtime exception module may be provided by a developer of an application, who may construct the runtime exception module so as to customize the failure data collected. In this way, customized failure data can be collected by an operating system error reporting service for native-mode applications, or even for managed applications.

Likewise, the debugger specific to the application may enable a user to debug that application, even in scenarios in which a debugger that is otherwise available within an operating system for debugging native mode applications would not operate or would not provide suitable functionality.

The foregoing us a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The utility of an error reporting service within an operating system of a computer may be extended by allowing the service to access components that perform functions customized for applications running on the computer. These components may perform functions associated with collection of failure data (such as may relate to an application hang or a crash), debugging applications that have crashed or hang, or other functions. In some embodiments, the components are customized runtime exception modules that collect failure data and/or debuggers adapted for debugging specific applications.

By accessing the registered components in response to a failure, the error reporting service may provide customized error reporting functionality for native applications, managed applications or other non-native applications for which conventional error reporting services would not be effective. Nonetheless, a conventional framework of an error reporting system can be used. That framework can collect and aggregate failure data from native or non-native applications. Similarly, through that framework, a user may be offered an opportunity to debug a failed native or non-native application using a suitable debugger.

Figure 1:
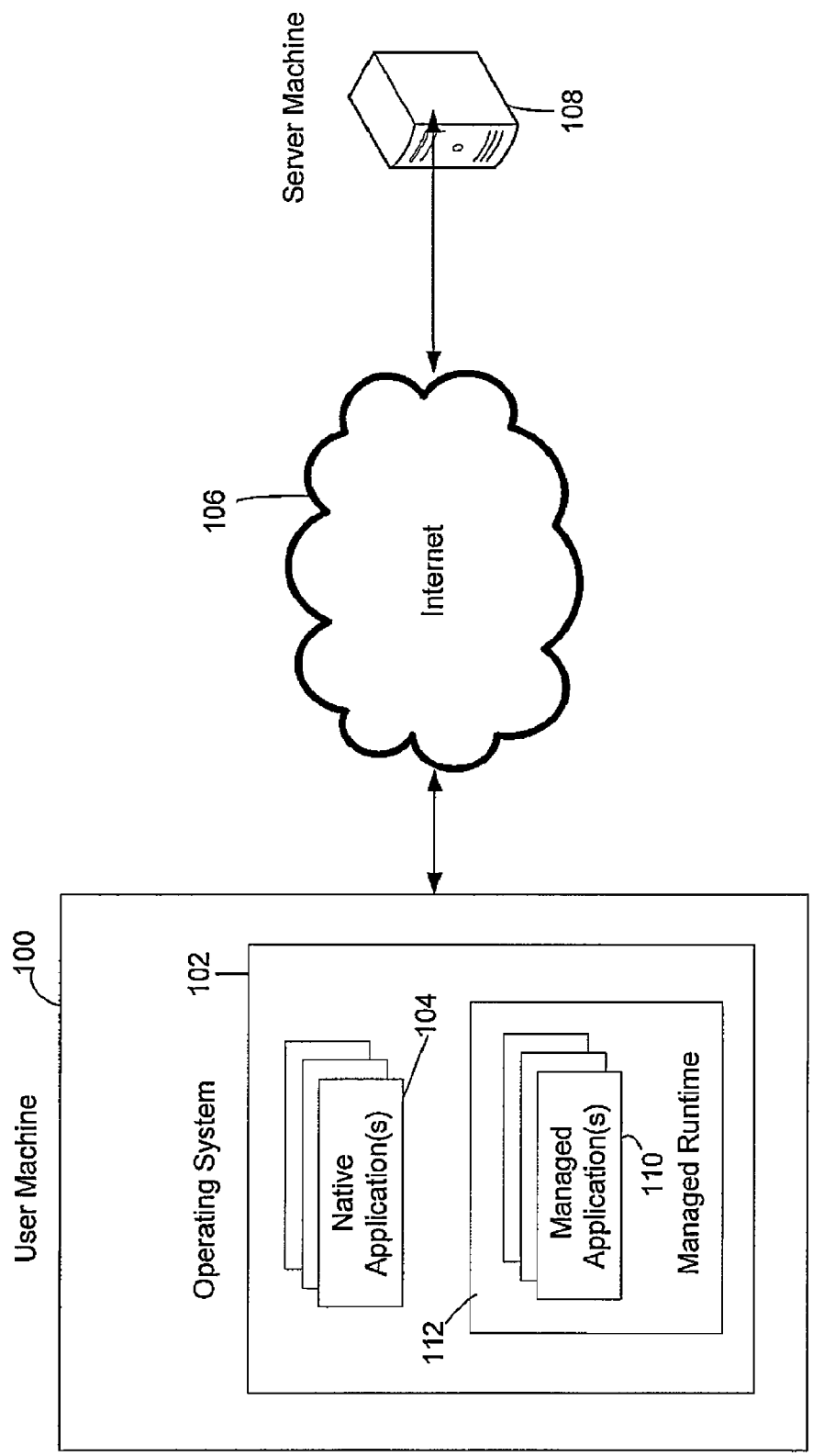
FIG. 1 is a high-level architectural diagram of an environment in which the invention may be practiced.

FIG. 1 is a high-level architectural diagram of an environment in which the invention may be practiced. The environment of FIG. 1 includes one or more user machines, illustrated by a user machine 100. User machine 100 may be any suitable computing device, such as a laptop computer, a desktop computer or a smart phone. User machine 100 is loaded with an operating system 102, which may be any suitable operating system, such as a version of the WINDOWS® VISTA® operating system provided by Microsoft Corporation. The operating system 102 provides an execution environment for one or more native application(s) 104. The native application(s) 104 may be any suitable applications capable of executing natively on the operating system 102, such as a word processor, spreadsheet application or a digital music library. Native applications 104 are prepared using utilities provided by and other constraints imposed by operating system 102. Accordingly, native applications 104 can operate on the computing platform provided by user machine 100 and operating system 102 without translators or other intermediary mechanisms.

One of the functions that may be provided by operating system 102 is error reporting. If an application fails, the operating system 102 may be made aware of the failure. Operating system 102 may include a mechanism as is known in the art for being made aware of an application failure. As one example, if an un-handled exception occurs while an application is executing, the exception may be handled within operating system 102. The un-handled exception may be treated as an indication of a "crash" within the application. Though, the invention may be also applied to other types of application failures, and other methods of detecting an application failure alternatively or additionally may be employed within operating system 102.

Regardless of the manner in which the operating system 102 detects a failure, once a failure is detected, operating system 102 may gather data relating to the failure. Native mode application 104 is configured to interface with an error reporting component within operating system 102, even in the event of a failure, such that the failure data gathered by operating system 102 may include attributes that can be used to characterize the failure. The attributes may include, for example, an exception code for an unhandled exception that led to a crash, and the module (e.g., shared library) and offset within the module of the failed application that was being executed at the time the failure occurred. Such failure data collection is known in the art and the data may be collected using known techniques, though the invention is not limited by the nature of failure data collected or the mechanism by which the data is collected.

Regardless of what data is collected, it may be used in any suitable way. The operating system 102 may provide to the user of the failed application the ability to debug the failed application with a default system debugger. Alternatively or additionally, the failure data may, with user permission, be transmitted to another entity for analysis, such as an analysis component local to the user machine 100 or another computing device such as server machine 108. Server machine 108 may be any suitable computing device. Server machine 108 may be configured to receive and analyze failure data from a plurality of computing devices, such as user machine 100. Data may be transmitted to server machine 108 in any suitable way, including over any suitable computer communications medium, such as the Internet 106. The failure data provided to the server machine 108 may be analyzed by software developers to determine the cause of an application failure and develop fixes to address uncovered issues or may be used in any other suitable way.

The user machine 100 may also include one or more application(s) that are not native mode applications. FIG. 1 illustrates managed application(s) 110, which do not execute natively on the execution platform provided by operating system 102, but execute in an environment provided by a managed runtime 112. The managed runtime 112 may be any suitable runtime execution environment that executes on top of the operating system 102, such as the Common Language Runtime or the Internet Explorer runtime provided by Microsoft Corporation, or the Java Runtime Environment provided by Sun Microsystems.

Though managed runtime 112 executes on operating system 102, managed applications 110 do not execute directly on operating system 102, but rather in the managed runtime environment 112, and therefore may have different execution characteristics than native applications 104. Nonetheless, a developer of a managed application may wish to obtain failure data on managed applications. Because managed application(s) 110 do not execute natively on the operating system 102, failure attributes pertaining to native application(s) 104, but obtained from a failed managed application 110 may not effectively characterize the failure of the managed application 110. Accordingly, a software developer may specify to the operating system 102 additional or alternative attributes to be gathered upon a failure of all managed applications 110 executing within the managed runtime 112.

According to some embodiments of the invention, a computer system may be adapted to allow failure data to be readily collected from non-native applications. The error reporting capabilities may make failure data available for a non-native application that mimics the failure reporting for a native application. Though, in some embodiments, the computer system can collect an amount or type of failure data specified by an application developer, allowing error reporting to be customized by the application developer.

In addition, a developer of a native application, such as one of native application(s) 104, may require or desire additional or alternative failure data to be collected than what is collected by the default error reporting scheme provided by the operating system 102. For example, the failure attributes gathered by default by the operating system may not provide particular details that would be useful to the developer in analyzing a failure of the native application. Accordingly, in some embodiments of the invention, a computer system may be adapted to allow customized failure data to be collected from native applications. In general, the ability to customize the failure information gathered for an application may be available to the developer of any application capable of executing on the user machine 100, including the native application(s) 104.

As in the case of native application(s) 104 that use the default error reporting scheme provided by the operating system 102, failure data gathered from applications using customized failure reporting, such as managed application(s) 110 or native application(s) 104 that use customized reporting, may also be transmitted to an entity, such as server machine 108, that performs analysis on the failure. In the embodiment illustrated, the same framework for transmitting and aggregating failure data may be used for both managed and native applications.

In some embodiments, the computing system may be adapted to allow a developer to also customize the behavior of the debugger for an application. For example, the developer may specify an alternative debugger to be used for failed managed applications 110, instead of the default system debugger which is otherwise used. The developer of a native application may also specify an alternative debugger to be used on the native application, if, for example, the developer desires additional functionality not available in the default system debugger. In such embodiments, the same user interface for notifying users of debug options for failed applications that are using the default error reporting may be also used for both customized native and non-native applications.

In some embodiments, a computer system may be adapted to support customized failure data collection through modifications of its operating system. The operating system may allow applications to register modules provided as part of the application that are to be invoked following a failure. These modules may provide failure data, invoke a debugger or perform other post-failure functions.

Figure 2:
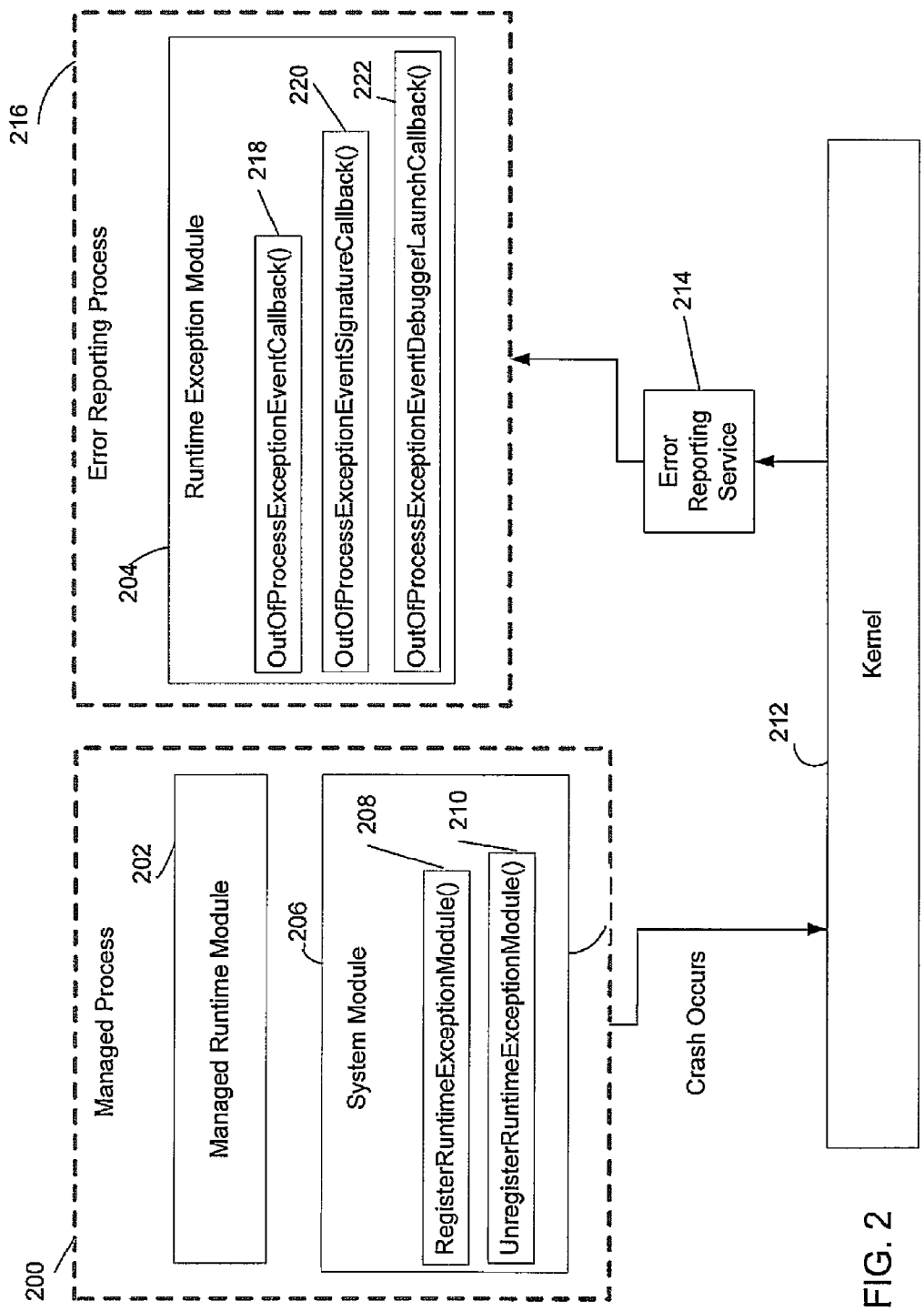
FIG. 2 is detailed architecture diagram of some embodiments of the invention.

FIG. 2 illustrates a more detailed architecture of some embodiments of the invention, as may be implemented within operating system 102 in user machine 100 of FIG. 1. While the embodiment illustrated in FIG. 2 applies the invention to a situation involving a crash of a managed process 200, which may be one of the managed application(s) 110, the invention may also be applied to other types of failures, such as an application hang, as the invention is not limited in this respect. In addition, a similar architecture may also be used for supporting customized error reporting of a native-mode application.

Managed application(s) 110 execute as one or more applications within managed processes, such as managed process 200. Managed process 200 provides a managed runtime environment, such as the managed runtime 112 illustrated in FIG. 1. A managed process may be provided using techniques as known in the art. Though, managed process 200 may execute in any suitable way.

In the embodiment illustrated in FIG. 2, the managed application includes a managed runtime module 202 which provides some element of the functionality of the managed application. The managed runtime module 202 may be implemented using techniques as are known in the art. Though, a managed runtime module may be implemented in any suitable way. As one example, the managed runtime module 202 may be implemented as a shared library dynamically loaded in the managed process 200. However, any suitable implementation of the managed runtime environment is possible, including a statically linked library, as the invention is not limited in this respect.

In addition, while only one managed runtime module 202 is illustrated, it is possible for a process to include more than one managed runtime module, each module providing support for a managed application executing in a different managed runtime environment. Accordingly, such a process including more than one managed runtime modules may comprise a number of managed applications, in which some managed applications execute in a different managed runtime environment than other managed applications. For example, a program such as Internet Explorer provided by Microsoft Corporation may need to link to two different types of managed runtime modules, such as one providing the functionality of the Common Language Runtime, and another providing the functionality of the Java Runtime Environment. Thus, the invention may be practiced in environments including processes with any number of managed runtimes, including none, such as native application(s) 104.

A managed application, even if not a native application, may be configured to provide crash data or to otherwise respond to a crash. In the embodiment illustrated by FIG. 2, the software developer of the managed application or of the managed runtime module provides a runtime exception module 204. The runtime exception module 204 may contain computer-executable instructions for gathering crash information customized for an application with which it is associated. Runtime exception module 204 may be implemented in any suitable way, including as a dynamically linked shared library. In the event of a crash, an error reporting component of operating system 102 may obtain crash data from the runtime exception module.

Though FIG. 2 shows a single runtime exception module, it is not a requirement that there be a one-to-one relationship between runtime exception modules and managed applications. An application may contain multiple runtime modules, and modules within the application may have associated runtime exception modules. Alternatively, the runtime exception module 204 may have been created by the developers of the managed runtime environment, and may be used by some or all of the managed applications executing in that managed runtime environment.

Operating system 102 may access a runtime exception module in any suitable way. In the embodiment illustrated, a registration mechanism is used such that operating system 102 has information it can use to invoke a runtime exception module. As each managed runtime module 202 starts execution, it may register a runtime exception module with the operating system. Registration may involve making information that operating system 102 can use to invoke the runtime module available to operating system 102 in a format that will persist even if the runtime module crashes.

As a specific example, the information may be provided in files in a particular format, such as XML, stored in a location known by the operating system 102. The files may contain a path to one or more runtime exception modules implementing crash customizations for that application. In another example, applications making use of crash customizations may register the location of their runtime exception modules in a known location in a registry, such the registry included in variants of the Windows Operating System provided by the Microsoft Corporation.

The registration may be performed by any suitable component, such as the managed runtime environment or a module executing inside the managed runtime environment. Alternatively or additionally, this registration process may be performed using utilities provided by operating system 102. As one example, operating system 102 may provide a programming interface that can be called by a runtime module as it is initiated. The runtime module may provide registration information to operating system 102 through this interface. In this scenario, the operating system may store the registration information in any suitable format, which may be transparent to the managed application developer.

In the embodiment illustrated by FIG. 2, the managed runtime environment operating within managed process 200 includes a system module 206 which incorporates a functional entry point, the RegisterRuntimeExceptionModule( ) function 208, for registering runtime exception module 204. In some embodiments of the invention, the managed process 200 may itself call the RegisterRuntimeExceptionModule( ) function 208 when it starts executing. In other embodiments of the invention, if the managed process 200 executes in a managed runtime environment implemented as managed runtime module 204, the managed runtime module 204 may call the RegisterRuntimeExceptionModule( ) function 208 when it first loads.

The system module 206 may be implemented in any suitable way. In some embodiments, it is a dynamically linked shared library provided by the operating system 102 to which all applications using customized crash information may link. In some implementations, the system module 206 may be a module, such as kernel32.dll in variants of the WINDOWS® Operating System, which provides other functionality that would be used by many applications executing on the operating system 102; therefore, in these implementations, linking to the system module 206 may not impose any additional burden on an application using customized crash information, because that application would likely already have linked to the system module 206 for other reasons.

Besides the RegisterRuntimeExceptionModule( ) function 208, the system module 206 may also include an UnregisterRuntimeExceptionModule( ) function 210 for unregistering the runtime exception module 204 associated with the managed process 200 and/or the managed runtime module 204. The UnregisterRuntimeExceptionModule( ) function 210 may be called when the managed process 200 is about to terminate normally, or in other embodiments of the invention, it may be called when the managed runtime module 204 is unloading. Both the RegisterRuntimeExceptionModule( ) function 208 and the UnregisterRuntimeExceptionModule( ) function 210 may be implemented in any suitable way. In some embodiments of the invention, the functions 208 and 210 may include at least two parameters, a first parameter indicating a name of the runtime exception module 204 being registered or unregistered, and a second, opaque, parameter indicating a caller specified context in which it is being used for error reporting.

Though not expressly shown in FIG. 2, other interfaces may similarly be provided for registering and unregistering components to act as debuggers or to perform other functions associated with the error reporting. Such interfaces may be implemented and be called similarly to the RegisterRuntimeExceptionModule( ) function 208 and the UnregisterRuntimeExceptionModule( ) function 210.

Regardless of the form in which registration information is made available to operating system 102, upon occurrence of a failure of an application within a managed runtime environment, operating system 102 may use the information to invoke the runtime exception module associated with the module that crashed. Operating system 102 then can obtain crash data from the runtime exception module and process it in any suitable way, including known techniques for reporting crash data.

The crash data may be made available in any suitable way. As one example, the runtime exception module may store crash data in a location accessible by the operating system. A developer of the managed application may indicate the location of the crash data to the operating system 102 in any suitable way. In some embodiments of the invention, invoking the runtime exception module may involve configuring the runtime exception module to place information in a location that can be identified by operating system 102 in the event of a crash. Alternatively or additionally, registration of a runtime exception module may include specifying a location where the module will store crash data. As another example, when invoked, the runtime exception module may return information indication the location of the crash data. Accordingly, the mechanism by which crash data is made available is not a limitation on the invention.

In the embodiment illustrated in FIG. 2, if at some point in its execution, a crash occurs within managed process 200, such as may occur if an unhandled exception occurs, control of the managed process 200 may be passed to the kernel 212 of the operating system. Upon detecting the unhandled exception, kernel 212 may invoke an error reporting service 214 to service the crashed managed process 200. The error reporting service 214 may be implemented in any suitable way, such as a WINDOWS® Service in variants of the WINDOWS® Operating System, or as a system daemon in variants of UNIX® operating systems.

In some embodiments, the error reporting service 214 may itself gather the customized crash information. However, any suitable component may gather the customized crash information, as the invention is not limited in this respect. Accordingly, as illustrated in FIG. 2, the error reporting service 214 may then launch an error reporting process 216 to attempt to gather the customized crash information, such as attributes of the crash, from the crashed managed process 200. The error reporting process 216 may be implemented as a standard operating system process, but in some embodiments of the invention, the error reporting process 216 may execute in the security context of the managed process 200 in which the crash occurred. In some embodiments of the invention, the crashed managed process 200 is suspended at this point, allowing the error reporting process 216 to access its address space. Making use of a dedicated process, such as error reporting process 216, created by the operating system for gathering the customized crash information yields more reliable results than gathering the crash information from the crashed managed process 200 itself, because the state of the crashed managed process 200 may be compromised at that point. For example, the crashed managed process 200 may have corrupt memory, or a thread in the managed process 200 may have run out of stack space.

The crash data may be any suitable data that can be obtained from the crashed managed process 200, and may be gathered in any suitable format, as the invention is not limited in these respects. Because the runtime exception module 204 can be associated with a specific application or portion of an application, the crash data collection may be customized for that application. For example, the crash data may include any information accessible to the runtime exception module 204 that may be useful in the analysis of the crash. The data may include information specific to the crashed managed process 200, a specific application or a specific module within an application. This information may include a process handle, handles for all threads in the process, including the thread in which the unhandled exception occurred, any portion of the address space of the crashed managed process 200, including initialized and uninitialized data (e.g., stack or heap) and machine-executable instructions, contents of processor registers currently in use by the managed process, and contents of files opened by the crashed managed process 200. The data may also include information pertaining to the system in general at the time the crash occurred that is not specific to the crashed managed process 200. The quantity of data to be gathered, either in aggregate, or for each type of data, is also not a limiting aspect of this invention. The data may be collected into any suitable format, including binary, text, structured data, such as XML, and including any combination of the above.

In the embodiments of the invention illustrated by FIG. 2, the data may include an event name, which may broadly characterize a crash; thus, an event name may be thought of as a crash "category" that may encompass multiple types of crashes. In some embodiments of the invention, including the one illustrated by FIG. 2, the data may be in the format of crash attributes, which may be implemented in any suitable way, such as name-value pairs. In some embodiments of the invention, the combination of the names and values of the crash attributes and the event name may uniquely characterize a crash (i.e., provide a "signature" for the crash). In some embodiments of the invention, the number, names, and possible values of the crash attributes may be customizable, and thus provide a flexible crash reporting scheme to the developer of an application. Some embodiments of the invention may require the number and names of the crash attributes to be fixed within each event name, but allow the values of the crash attributes to vary within the event name. Other embodiments of the invention, however, may allow for gathering the data in additional or alternative formats, as discussed above, as the invention is not limited in this respect.

The crash attributes may include a variety of types of information, as the invention is not limited in this respect. In some embodiments of the invention, the attributes may include an exception type or exception code for the unhandled exception that led to the crash, the location of the exception, an assembly name, timestamp, and version, a module name timestamp, and version in which the crash occurred, a method token identifying the method in which the crash occurred, or the offset within that method specifying the specific instruction that led to the crash. However, other embodiments may gather additional or alternative types of attributes, as the invention is not limited in this respect.

The number, type, and possible values of the crash attributes for an application using customized crash reporting may differ from that of an application, such as native application(s) 104, using the default crash reporting scheme provided by the operating system 102. For example, one possible crash attribute in the default scheme may be an exception code, which may correspond to a number for the unhandled exception which led to the crash. On the other hand, a more meaningful crash attribute in a customized application which executes in a managed runtime environment may be an exception type, which may instead have a string value. As another example, an application using the default crash reporting scheme may include a crash attribute indicating the module (e.g., shared library) and the offset within the module in which the crash occurred. In a customized application, more meaningful crash attributes may instead be a method and offset within the method at which location the crash occurred.

Regardless of the type or quantity of crash information to be gathered, the error reporting process 216 may access the runtime exception module 204 associated with the managed process 200 in order to gather the customized crash information from the crashed managed process 200. Access to the runtime exception module 204 may be in any suitable way. In some embodiments of the invention, access may be achieved by loading runtime exception module 204 and accessing a pre-defined set of functional entry points exported by the runtime exception module that may be called by the error reporting process 216 in order to gather the customized crash information. In the embodiment illustrated by FIG. 2, the runtime exception module 204 exports three functional entry points, the OutOfProcessExceptionEventCallback( ) function 218, the OutOfProcessExceptionEventSignatureCallback( ) function 220, and the OutOfProcessExceptionEventDebuggerLaunchCallback( ) function 222. However, other embodiments of the invention may employ a lesser or greater number of functional entry points for the managed runtime module 204, as the invention is not limited in this respect. For example, the functionality ascribed to a single entry point in the embodiment illustrated by FIG. 2 may be divided among a number of entry points in other embodiments of the invention; conversely, the functionality implemented by multiple functional entry points as illustrated in the embodiment of FIG. 2 may be consolidated into a single functional entry point in other embodiments of the invention.

The OutOfProcessExceptionEventCallback( ) function 218 may be called to determine if the runtime exception module 204 claims ownership of the crash (i.e., whether it is an appropriate runtime exception module for this type of crash), and if it does, also to obtain an event name for the crash and a count of the crash attributes. Function 218 may be implemented in any suitable way. Such a function may be used, for example, in embodiments in which error reporting process 216 identifies an appropriate runtime exception module for an un-handled exception. The error reporting process 216, for example, may load one or more registered runtime exception modules. In response to an un-handled exception, the error reporting process 216 may call the OutOfProcessExceptionEventCallback( ) function 218 of each loaded runtime exception module until one of the modules indicates that it is adapted to handle the crash.

In the embodiment illustrated by FIG. 2, runtime exception module 204 may be passed the same opaque parameter indicating the caller specified context that was passed to the RegisterRuntimeExceptionModule( ) function 208. In some embodiments, the call may populate a number of out parameters that can be used by the caller of the function, such as the error reporting process 216. One such out parameter may indicate whether or not the runtime exception module 204 claims the crash. A second out parameter may indicate an event name for the crash. A third out parameter may indicate a count of the number of crash attributes. However, other embodiments of the invention may include a different number or type of out parameters. For example, some crashes may gather data information in a format that does not include either an event name or attributes.

The OutOfProcessExceptionEventSignatureCallback( ) function 220 may be called to obtain the names and values for the crash attributes, whose count was determined following a successful call to the OutOfProcessExceptionEventCallback( ) function 218. As in function 218, in some embodiments of the invention, function 220 may be passed the same opaque parameter indicating the caller specified context. In some embodiments of the invention, function 220 may also be passed an index representing a specific crash attribute. A call to function 220 may populate a number of out parameters, which may include the name and the value of the crash attribute corresponding to the index.

After the crash information has been gathered by the error reporting process 216, in some embodiments of the invention, the operating system 102 may present a user with the option to analyze the crash with a debugger. This may be done in any suitable way, but in some embodiments of the invention, the error reporting process 216 may display a user interface such as a dialog box to the user after a process has crashed and the error reporting process 216 has gathered the crash information from the crashed process. The dialog box may include a control, such as a button labeled "Debug," which the user may select to launch a debugger application to debug the crash.

It may be useful to a user debugging the crash of an application making use of customized crash information to use a debugger application other than the system default debugger. For example, a managed runtime environment may provide to developers or users a custom debugger for applications that execute in the managed environment; therefore, it may be desirable to debug the crash of a managed runtime application like managed process 200 with the custom debugger application provided for that purpose by the managed runtime environment. In some embodiments of the invention, it may also be possible to customize other options relating to the debugger. For example, it may be desirable in some situations to specify whether or not a debugger, whether it is the system default debugger or a custom debugger, launches automatically upon a crash of the customized application, without requiring the intervention of a user to select a control in a user interface, as described above. However, any suitable option relating to the debugger may be customized in various embodiments of the invention, as the invention is not limited in this respect.

The OutOfProcessExceptionEventDebuggerLaunchCallback( ) function 222 may be used to customize the behavior of a debugger for the crashed managed process 200. Function 222 may be implemented in any suitable way. As in functions 218 and 220, in some embodiments of the invention, function 222 may be passed the same opaque parameter indicating the caller specified context. Also, like functions 218 and 220, a call to function 222 may populate a number of out parameters. For example, a first out parameter may indicate whether or not a custom debugger launch option is needed by the customized application, such as managed process 200. If the first out parameter indicates that a custom debugger is needed, then in some embodiments of the invention, additional out parameters may also be meaningful for the consideration of the caller of function 222. For example, a second out parameter may contain a string value with the path to a custom debugger. The custom debugger specified in the second out parameter may be used instead of the system default debugger in the event a debugger is launched on the crashed process, whether that launch happens automatically or as a response to user input, as discussed above. Some embodiments of the function 222 may also include a third out parameter to specify whether the debugger should automatically launch upon a crash, or if instead the debugger should only launch in response to user interaction, as discussed above.

Figure 3:
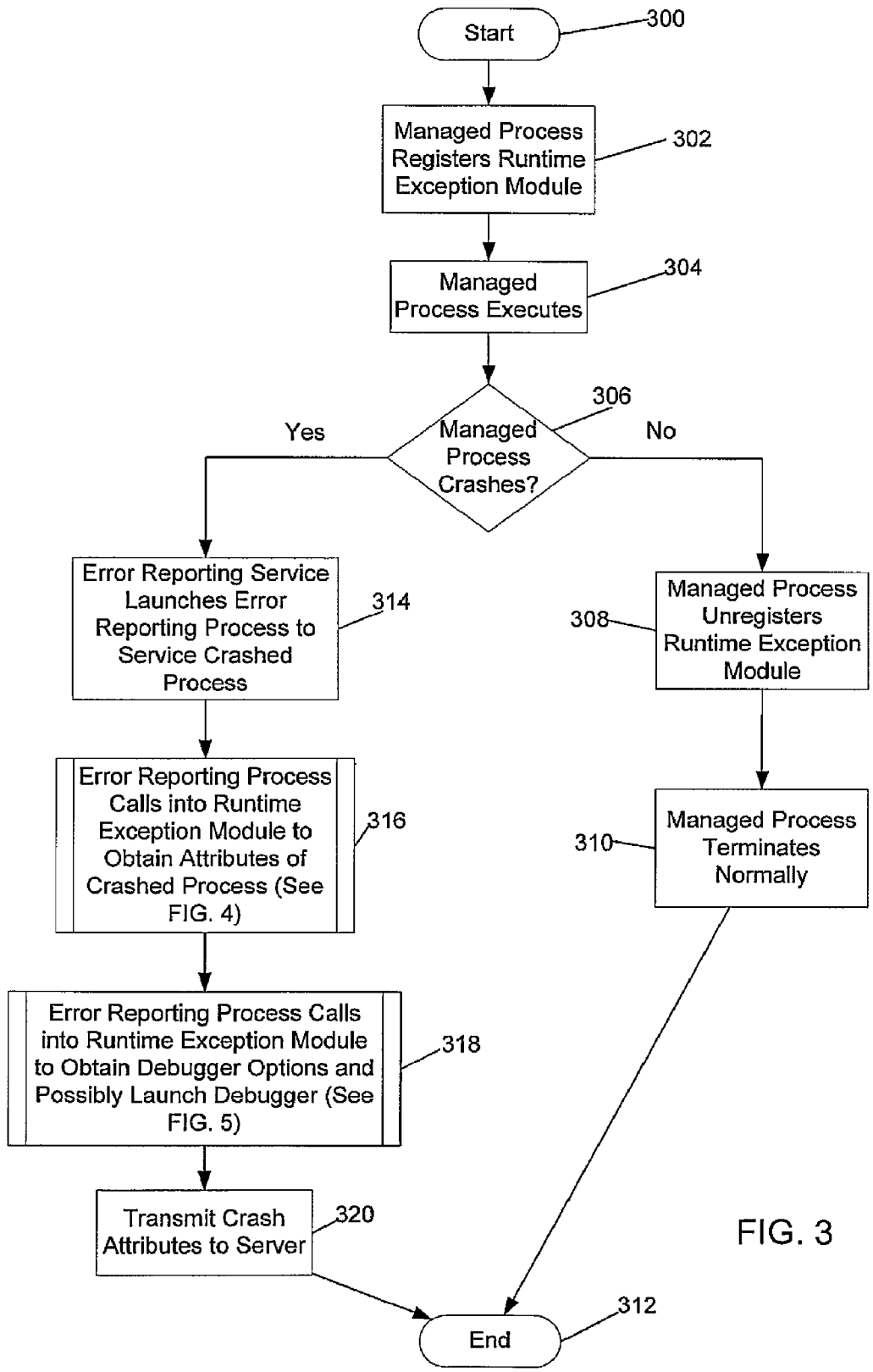
FIG. 3 is a flow chart illustrating a high-level method of implementing error reporting according to some embodiments of the invention.
Figure 4:
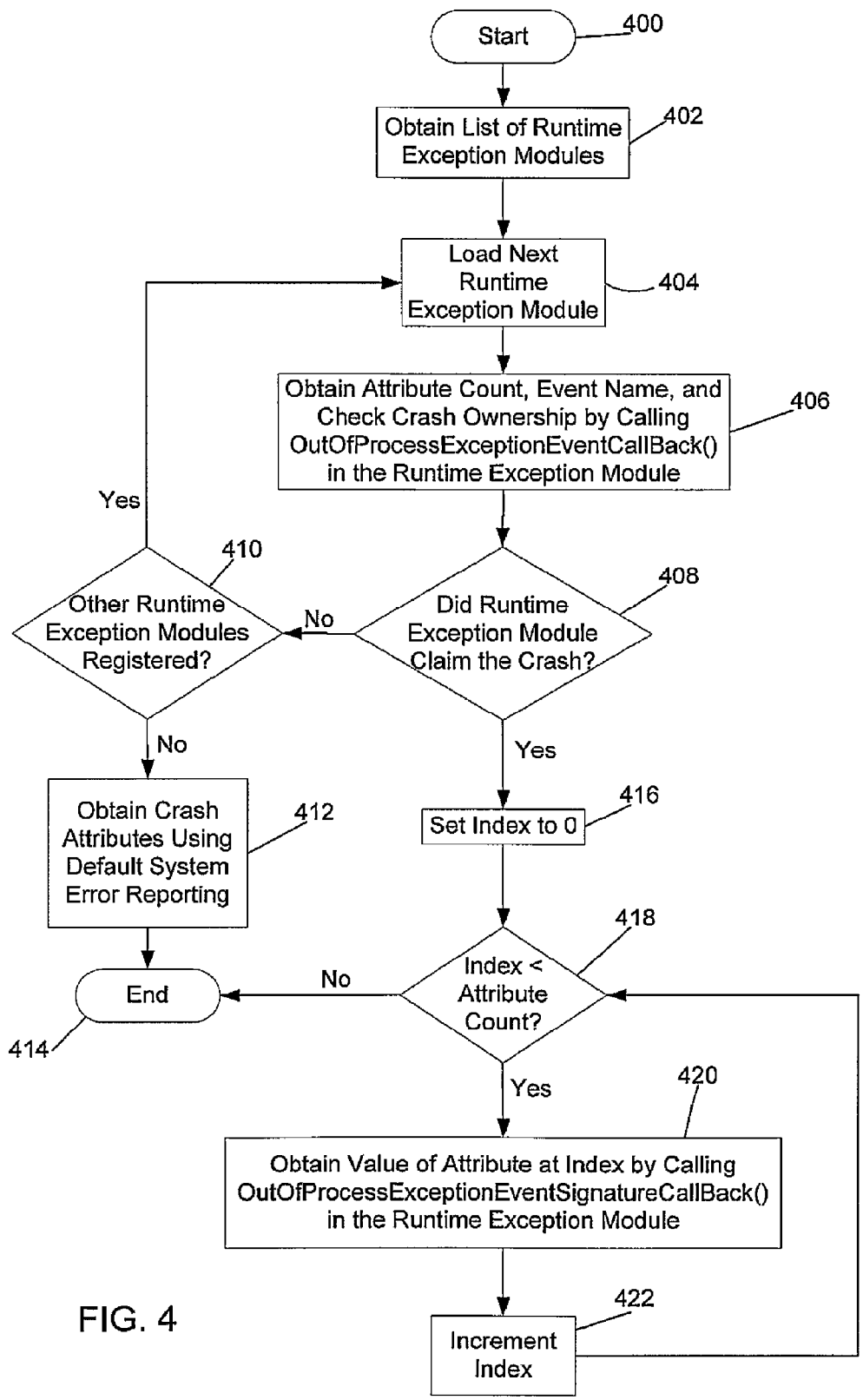
FIG. 4 is a flow chart illustrating a method for obtaining customized crash information from a crashed process.
Figure 5:
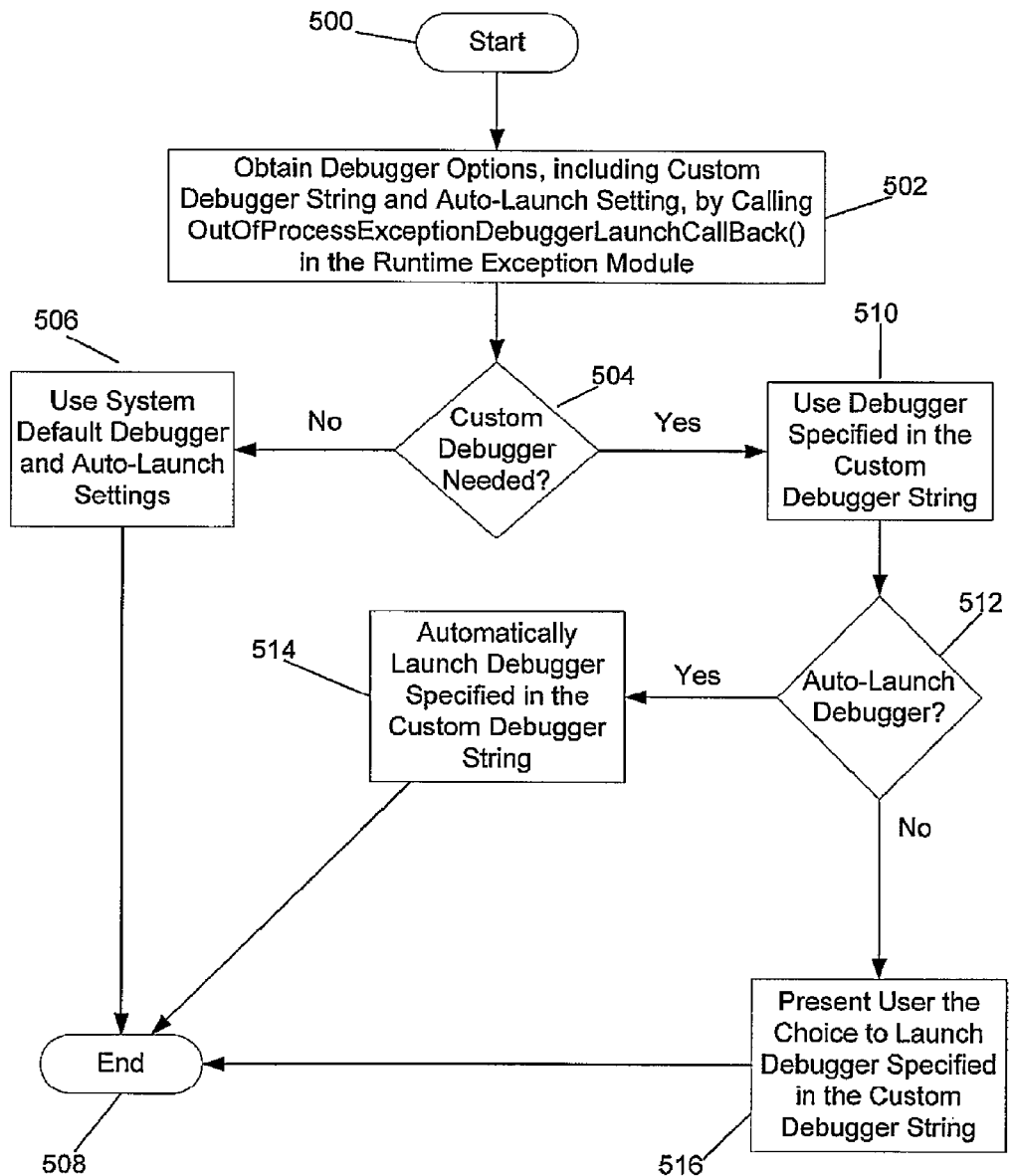
FIG. 5 is a flow chart illustrating a method for obtaining customized debugger information for a crashed process.

FIGS. 3-5 are flow charts of a method of implementing error reporting according to some embodiments of the invention. Specific implementation details of the method illustrated in FIGS. 3-5 relate to embodiments of the invention having architectures similar to that illustrated in FIG. 2, as discussed above; however, the method may be applied more generally. In particular, while the method illustrated in FIGS. 3-5 applies the invention to a situation involving a crash of a managed process, the invention may also be applied to other types of failures, such as an application hang, as the invention is not limited in this respect. In addition, a similar method may also be used for supporting customized error reporting of a native-mode application.

The method starts at block 300 of FIG. 3 when a "managed process" starts execution. A managed application for which crash data collection, debugging or other post-crash functions are desired may execute within such a managed process. If the managed process comprises a managed application that executes in a managed runtime environment implemented as one or more loadable modules, the managed process may at this point dynamically load the managed runtime modules. In the example of FIG. 2, only one such managed runtime module 202 is illustrated, but more than one may be loaded.

At block 302, a runtime exception module, such as runtime exception module 204 illustrated in FIG. 2, associated with a loaded runtime module is registered with the operating system, such as operating system 102. The runtime exception module provides the functionality of the crash customization for the managed process. As discussed in conjunction with FIG. 2, the registration of the runtime exception module may be performed in any suitable way. For example, in the embodiment of FIG. 2, the registration may be performed by calling a function entry point, such as the RegisterRuntimeExceptionModule( ) function 208 exported in a system shared library dynamically linked to the managed process or the managed runtime environment. The calling of function 208 may be performed either by the managed process itself, or, if applicable, by a managed runtime module providing a managed runtime environment in which the managed process executes.

The managed process then, in block 304, continues execution, as usual. Block 306 is intended to illustrate the possibility that the managed process may crash at some point in its current execution. If the managed process does not crash in this current execution, as the process begins a termination process, it may at block 308, unregister the runtime exception module with the system. However, the runtime exception module may alternatively be unregistered by the managed runtime module, if applicable. The un-registration step may be performed in any suitable way. In embodiments of the invention with an architecture similar to that illustrated in FIG. 2, the registration may be performed by calling a function entry point, such as the UnregisterRuntimeExceptionModule( ) function 210 exported in a system shared library dynamically linked to the managed process or the managed runtime environment. At block 310, the managed process may then terminate execution normally, and proceed to end block 312.

However, if at block 306, the managed process does crash at some point, such as may occur if it encounters an unhandled exception, as discussed in conjunction with FIG. 2, the control of the crashed managed process may be by the operating system kernel, such as kernel 212. Kernel 212, upon detecting the crash, may invoke an error reporting service, such as error reporting service 214, which may be a component of the operating system 102. At block 314, the error reporting service may launch an error reporting process, such as error reporting process 216 discussed in conjunction with FIG. 2 to service the crashed process.

At block 316, the customized crash information may be obtained from the crashed managed process. This may be done in any suitable way. In the embodiment illustrated in FIG. 2, error reporting process 216 may call into a function entry point in one or more runtime exception modules to determine if a runtime exception module claims the crash, and if so, to obtain attributes of the crashed process. A check may be performed so that if none of the runtime exception modules claims the crash, the method may handle the error using the default error reporting provided by the operating system. More details of this step are provided in FIG. 4, discussed at greater length below.

In block 318, the method may obtain debugger options, and launch a debugger on the crashed managed process, if appropriate. This may be done in any suitable way, however, in the embodiment illustrated by FIG. 2, this step is performed by the error reporting process 216 that calls into a function entry point in the runtime exception module to obtain the debugger options. If applicable, a debugger application may be launched on the crashed managed process. More details of this step are provided by FIG. 5, which is discussed below.

The method then proceeds to block 320, in which the customized crash information is transmitted to an analysis component, such as server machine 108, as discussed in conjunction with FIG. 1. This step may be performed in any suitable way and may be restricted to occur only with user consent. In some embodiments of the invention, the customized crash information is transmitted to the server machine 108 by an error reporting service, such as error reporting service 214. At this point, the method may be done, and proceed to end block 312.

FIG. 4 is a flow chart illustrating a method for obtaining the customized crash information from the crashed managed process, and provides more details for block 316 in FIG. 3. The method may be implemented by any suitable component. In the embodiment illustrated by FIGS. 2 and 3, the method of FIG. 4 is implemented by the error reporting process 216. The method starts at block 400. At block 402, the method may obtain a list of runtime exception modules. In some embodiments, the list contains all runtime exception modules that have been registered with the operating system, across all applications. In other embodiments, the list contains runtime exception modules that pertain to the particular managed process for which the method is attempting to gather the customized crash information. As discussed in conjunction with FIG. 2 above, a process may have more than one runtime exception module registered with it.

At block 404, the error reporting process may load the next runtime exception module from the list, which may be the first module in the list if this is the first time this step has been performed. At step 406, the method may then check to see if the currently loaded runtime exception module claims the crash. This step may be performed in any suitable way. In the embodiment illustrated by the architecture of FIG. 2, this step is performed by calling the OutOfProcessExceptionEventCallback( ) function 218 in the currently loaded runtime exception module, which may populate an out parameter with an indication of whether or not the currently loaded module claims the crash.

At block 408, the method may check the value of the out parameter obtained in step 406. If the currently loaded runtime exception module did not claim the crash, the method proceeds to block 410, in which it checks to see if there is at least one other registered runtime exception module in the list that it has not yet tried. If so, the method proceeds back to block 404, and loads the next runtime exception module. Otherwise, if the error reporting process determines at block 410 that there are no more runtime exception modules in the list, the method proceeds to block 412, in which it may obtain crash information, such as crash attributes using the default system error reporting. The fact that no runtime exception module claimed the crash may not be an error. For example, the method may be called on all crashed processes, including those that never registered a runtime exception module. However, performing the step at block 412 may not be an error even for a process that had registered a runtime exception module. As an additional example, some processes may contain at least two different sets of computer-executable instructions-one set of instructions intended to be executed natively on the platform provided by the operating system, for which it may be most appropriate to use the default error reporting provided by the system, and another set of instructions intended to be executed in a managed runtime environment, for which it may be most appropriate to use a customized crash reporting scheme. The method of FIG. 4 may then be finished at this point, and may proceed to end block 414.

Returning to block 406, the call to the OutOfProcessExceptionEventCallback( ) function 218 may have populated its out parameter with an indication that the currently loaded runtime exception module did claim the crash. As discussed in conjunction with FIG. 2, embodiments of the invention may obtain any suitable crash information from the crashed managed process, and in any suitable format. In the embodiment illustrated in conjunction with FIG. 2, the crash information is in the form of an event name and crash attributes, which may be implemented as a set of name-value pairs. In the embodiment illustrated by FIG. 2, in the case in which the call to function 218 indicates that the runtime exception module claims the crash, the call also populates two additional out parameters with some preliminary customized crash information. One additional out parameter contains an event name used for broadly characterizing the crash, while the other additional out parameter contains a count of the crash attributes. Other embodiments, however, may obtain the customized crash information differently, including via a function call to one or more separate function entry points.

If at block 408, it is determined that the runtime exception module did claim the crash, the method then proceeds to obtain the remaining customized crash information. This may be done in any suitable way, and may be in any suitable format; however, in the embodiment illustrated by FIG. 2, the customized crash information is in the form of crash attributes. The method proceeds to block 416, in which it initializes an attribute index to zero. At block 418, the method then checks to see if the index is less than the attribute count obtained in block 406 as an out parameter to the call to function 218. If so, then the method proceeds to block 420, in which it obtains the name and value of the crash attribute corresponding to the current value of the attribute index. This step may be performed in any suitable way. In the embodiment illustrated by the architecture of FIG. 2, this step is performed by passing the attribute index as an argument to a call to the OutOfProcessExceptionEventSignatureCallback( ) function 220 in the currently loaded runtime exception module. A successful function call to function 220 then may populate out parameters containing the name and value of the crash attribute corresponding to the current value of the attribute index.

The method then proceeds to block 422, in which it increments the value of the attribute index. At this point, the method may return to block 418, in which it may check to see if it there are still more crash attributes to obtain by comparing the current value of the attribute index to the attribute count obtained in block 406. If there are still more crash attributes, the method repeats the steps at block 420 with the current value of the attribute index. These steps repeat until the method determines at block 418 that it has obtained all crash attributes, at which point the method is finished, and may proceed to end block 414.

FIG. 5 illustrates a method for obtaining customized debugger information for the crashed managed process, launching a debugger application, if applicable, and provides more details for block 318 in FIG. 3. The method may be implemented by any suitable component, including the error reporting service 214 or the error reporting process 216, or a combination of the two. The method starts at block 500. At block 502, the method obtains debugger options, which may be done in any suitable way. In the embodiment of the invention illustrated by the architecture of FIG. 2, this step is performed by calling the OutOfProcessExceptionEventDebuggerLaunchCallback( ) function 222 in the runtime exception module.

A successful call to function 222 may then populate out parameters containing the custom debugger options. As discussed in conjunction with FIG. 2, any suitable debugger options may be obtained, as the invention is not limited in this respect. The embodiment illustrated by FIG. 2 may include an out parameter indicating whether any debugger customization is required. If this out parameter indicates a need for debugger customizations, two other out parameters may also be populated with meaningful information—a parameter containing a custom debugger string specifying a path to a custom debugger application, and a parameter containing an auto-launch setting, specifying whether or not the debugger application should automatically be launched upon a crashed process.

The method may then proceed to block 504, in which it checks to see if a custom debugger is needed by the managed process. This may be done in any suitable way, although in the embodiment illustrated by FIG. 2, it may involve checking the value of the out parameter indicating whether any debugger customization is required. If no debugger customization is required, the method may proceed to block 506, in which it may use the system default settings for whatever options may be customizable. Thus, this may include using the system default debugger application and the system default auto-launch setting. The method may then proceed to end block 508.

Otherwise, if it is determined at block 504 that debugger customization is required, the method then proceeds to block 510, in which the method sets the debugger for this application to the custom debugger string specified as the value of the out parameter in function call 222. The method then proceeds to block 512, in which it checks the value of the auto-launch setting obtained in block 502. If the auto-launch setting indicates that the debugger should be automatically launched upon a crash of the managed process, the method may then proceed to block 514, in which it may automatically launch the debugger application specified in the custom debugger string, and may then proceed to end block 508, as the method of FIG. 5 may be currently finished. Otherwise, if the method determines at block 512 that the auto-launch setting indicates that a debugger application should not be automatically launched, the method proceeds to block 516. In block 516, as discussed in conjunction with FIG. 2, the method may present the user with a user interface, such as a dialog box, containing a control such as a button for launching the debugger application. Only if the user activates the control, such as by clicking the button, may the method proceed to launch the debugger application specified in the custom debugger string and debug the crashed managed process. The method may then proceed to end block 508, as the method of FIG. 5 may be finished at this point.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, embodiments of the invention may be provided using a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, embodiments of the invention may be provided via a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computer to classify failure data related to failures of an application executing on a computer, the method comprising:
    operating at least one processor associated with the computer to:
    dynamically register a component of a plurality of components associated with the application, the registered component being adapted to generate attributes that classify the failures, wherein the registering is performed by a managed runtime environment registering at least one component and the application registering the other of the components;
    execute the application within a process managed by the managed runtime environment; and
    in response to a failure within the process, obtain attributes that classify the failure by:
    invoking the registered component to determine if the registered component is adapted to generate attributes that classify the failure; and
    when the registered component is determined to be adapted to generate attributes that classify the failure, obtaining the attributes from the registered component by issuing a call to the registered component, wherein a result of the call provides failure data comprising attributes that classify the failure; and
    report the failure data to an error reporting service executing on the computer outside of the managed runtime environment.

2. The method of claim 1, wherein the method further comprises operating the at least one processor to register a plurality of components associated with the application, each of the plurality of components being adapted to generate attributes that classify a failure.

3. The method of claim 1, wherein the method further comprises:
    reporting, from the error reporting service, the failure data to a server computing device, the failure data comprising attributes that classify the failure.

4. The method of claim 3, wherein:
    the managed runtime environment dynamically registers at least one component of the plurality of components by calling a function entry point.

5. The method of claim 4, wherein the failure data further comprises an event name corresponding to a category that encompasses multiple types of failures.

6. The method of claim 5, wherein the failure within a process comprises a crash caused by encountering an unhandled exception within a process.

7. The method of claim 6, wherein an attribute comprises a name-value pair from the set comprising at least one of:
    an exception type corresponding to the unhandled exception;
    a module name in which the crash occurred;
    an offset in the module in which the crash occurred;
    a method token identifying a method in which the crash occurred; or
    an offset within the method in which the crash occurred.

8. The method of claim 5, wherein the failure within a process comprises an application hang within the process.

9. A computer-readable medium encoded with a program for execution on at least one processor, wherein the computer-readable medium is not a signal, the program, when executed on the at least one processor performing a method of reporting to a server computing device failure data related to a failure of an application executing in a managed runtime environment, the method comprising acts of:
    registering a plurality of components, each component associated with an application loaded for execution in the managed runtime environment, and each component being adapted to generate attributes that classify the failure;
    in response to encountering a failure in the application, invoking an error reporting process, the error reporting process being configured to:
    obtain a list of the plurality of registered components; and
    for each component of at least a portion of the registered components in the list: poll the component to determine if the component is adapted to generate attributes that classify the failure; and
    determine if the component is adapted to generate attributes that classify the failure, and when the component is determined to be adapted to generate attributes that classify the failure, issue a call to the component, wherein the result of the call provides failure data comprising attributes that classify the failure; and
    reporting the failure data to the server computing device, wherein registering a plurality of components comprises:
    registering, by the managed runtime environment, at least one component of the plurality of components; and
    registering, by the application, remaining components of the plurality of components.

10. The computer-readable medium of claim 9, wherein:
invoking an error reporting process comprises invoking an error reporting process by an error reporting service within an operating system executing on the at least one processor; and
reporting the failure data to the server computing device comprises reporting the failure data to the server computing device by the error reporting service.

11. The computer-readable medium of claim 10, wherein the failure data further comprises an event name corresponding to a category that encompasses multiple types of failures.

12. The computer-readable medium of claim 11, wherein the failure in the application comprises an application hang in the application.

13. The computer-readable medium of claim 12, wherein:
the failure in the application comprises a crash caused by encountering an unhandled exception in the application; and
an attribute comprises a name-value pair from the set comprising:
an exception type corresponding to the unhandled exception;
a module name in which the crash occurred;
an offset in the module in which the crash occurred;
a method token identifying a method in which the crash occurred; and
an offset within the method in which the crash occurred.

\* \* \* \* \*